United States Patent [19]

Mori et al.

[11] 3,742,027

[45] June 26, 1973

[54] STABILIZATION OF THERMALLY UNSTABLE DMT BY MIXTURE OF $C_1$-$C_4$ 09ALKANOL MATERIAL AND CERTAIN COBALT SALT MATERIAL

[75] Inventors: Hiroshi Mori; Michio Yamamoto; Chitoshi Kondo; Teruhisa Kimoto; Satoshi Takahashi; Toshiyuki Ochi, all of Matsuyama City, Japan

[73] Assignee: Teijin Hercules Chemical Company Limited, Tokyo, Japan

[22] Filed: Jan. 8, 1971

[21] Appl. No.: 105,072

[52] U.S. Cl. .............................................. 260/475 B
[51] Int. Cl. .............................................. C07c 69/82
[58] Field of Search .................. 260/475 B, 473 PR

[56] References Cited

UNITED STATES PATENTS 3,576,842 4/1971 Kimura et al. .................. 260/475 B

*Primary Examiner*—Lorraine A. Weinberger
*Assistant Examiner*—E. Jane Skelly
*Attorney*—George H. Hopkins

[57] ABSTRACT

Disclosed is the stabilization of thermally unstable dimethyl terephthalate (DMT) with a stabilizing quantity of the mixture consisting essentially of $C_1$—$C_4$ alkanol material and cobalt salt material selected from the group consisting of cobalt halides, aromatic carboxylic acid salts of cobalt, and aliphatic carboxylic acid salts of cobalt, the weight ratio of said cobalt salt material to said alkanol material being in the range from about 1:500,000 to about 1:2. The quantity of the mixture added to the DMT is generally from about five hundred parts to about ten parts by weight per million parts by weight of the DMT, and preferably from about one hundred to about thirty parts by weight per million parts by weight of the DMT.

10 Claims, No Drawings

STABILIZATION OF THERMALLY UNSTABLE DMT BY MIXTURE OF $C_1$-$C_4$ ALKANOL MATERIAL AND CERTAIN COBALT SALT MATERIAL

This invention is in the chemical arts. It has to do with that branch of organic chemistry pertaining to alcohol esters of aromatic dicarboxylic acids.

Dimethyl terephthalate (DMT) is a well known normally solid chemical of commerical importance. It is used in large quantities in the production of polyesters from which fibers and the like are made.

Recently, it has become common practice to ship and store DMT in the molten state, that is, at temperatures above 140°C. In some instances, however, DMT is unstable to the extent that under such conditions its color and acidity tend to increase substantially. As a result, the polyester made from it is off-color and sometimes has a degree of polymerization lower than the degree desired. The problem to which this invention provides a solution is how to stabilize thermally unstable DMT.

One solution to this problem is disclosed in the U.S. Pat. No. 3,505,390, to Hoffmann. According to this patent, DMT is thermally stabilized by adding to it in the molten state a quantity (0.01–3 percent by weight) of a monohydric, saturated aliphatic alcohol having one to four carbon atoms, or a mixture of monohydric, saturated aliphatic alcohols having one to four carbon atoms, with methanol being preferred.

However, all monohydric, saturated aliphatic alcohols having one to four carbon atoms boil below 140°C. at atmospheric pressure. Consequently, if the thus stabilized DMT is maintained in the molten state, the alcohol or mixture gradually evaporates. As the concentration of alcohol or mixture in the molten DMT decreases, the stabilization effect is reduced. Hence, if the thus stabilized DMT is to be maintained in the molten state for prolonged periods of time, it must be maintained under superatmospheric pressure or alcohol addition must be repeated or done continuously to maintain the concentration of the alcohol or mixture in the desired range. This may necessitate special equipment. Moreover, the vapors of alcohol or mixture, that escape from the DMT, can present a hazard, if in large enough concentration. In addition, if the concentration of the alcohol or mixture in the molten DMT is high (for example, 1–3 percent by weight) evaporation is rapidly increased with just a slight rise in the temperature.

On the other hand, when the DMT stabilized with the $C_1$—$C_4$ alkyl alcohol or a mixture of such alcohols is subsequently flaked or pelletized, the greater the concentration of alcohol or mixture in the DMT, the greater is the tendency for the DMT to adhere to the flaker or pelletizer.

For at least the vaporization and adhesion reasons, therefore, it is desirable to have the quantity of alcohol or mixture admixed with the thermally unstable DMT at as low a value as possible and preferably under 500 parts by weight per million parts by weight of DMT.

This invention provides a way of accomplishing this without a corresponding reduction in the stabilization of the thermally unstable DMT.

In summary, this invention comprises a thermally stable composition consisting essentially of thermally unstable DMT and dispersed therein at a stabilizing concentration the mixture (hereinafter referred to as the stabilizing mixture) consisting essentially of $C_1$—$C_4$ alkanol material and cobalt salt material selected from the group consisting of cobalt halides, aromatic carboxylic acid salts of cobalt, and aliphatic carboxylic acid salts of cobalt, the weight ratio of said cobalt salt material to said alkanol material being in a range from about 1:500,000 to about 1:2.

The $C_1$—$C_4$ alkanol material is material consisting essentially of a $C_1$—$C_4$ akanol. In some embodiments of this invention it comprises only one such alkanol. In other embodiments it comprises two or more such alkanols. The $C_1$—$C_4$ alkanols are methanol, ethanol, propanol, isopropanol, butanol, sec-butanol and t-butanol.

The cobalt salt material is material consisting essentially of at least one cobalt salt selected from the defined group. In some embodiments of this invention it comprises only one such cobalt salt. In other embodiments it comprises two or more such salts. In preferred embodiments the cobalt salt material comprises a cobaltous salt or salts selected from the defined group. Examples of salts of the defined group include cobalt chloride, cobalt benzoate, cobalt toluate, cobalt terephthalate, cobalt acetate, and the like.

While the weight ratio of the cobalt salt material to the alkanol material is generally in the above indicated range, in preferred embodiments of this invention it is in the range from about 1:10,000 to about 1:10. However, higher and lower effective weight ratios are within the broader concepts of this invention.

The quantity of the mixture added to the thermally unstable DMT is generally in the range from about five hundred to about ten parts by weight per million parts by weight of the thermally unstable DMT. In preferred embodiments of this invention it is in the range from about one hundred to about thirty parts by weight per milliion parts by weight of the thermally unstable DMT. In this range the maximum quantity of methanol added to the DMT is about 0.01 percent by weight of the DMT which the U.S. Pat. No. 3,505,390 indicates was not enough under the disclosed experimental conditions to achieve a good thermal stability. However, under the conditions of this invention such generally is enough to achieve a good thermal stability. In any event, higher and lower operative quantities are within the broader concepts of this invention. On the other hand, quantities such as to give a cobalt salt material concentration in the DMT greater than about five parts by weight per million parts by weight of thermally unstable DMT generally are to be avoided in preferred embodiments of this invention because of the possible presence of impurities accompanying the cobalt salt material, that could prevail over the alkanol(s) and cobalt salt or salts, and promote substantial thermal instability of the DMT.

The composition of this invention is made several ways.

In one procedure it is made by admixing the components of the stabilizing mixture alone, together or with other additives with the thermally unstable DMT in the molten state. This admixing can be performed by adding the components of the stabilizing mixture while stirring the molten DMT. It also can be done by blowing with an inert gas the alkanol(s) into the molten DMT and adding the cobalt salt material separately. The resulting molten composition can be maintained in the molten state until it is used, or it can be cooled until solid. When maintained in the molten state, it is usually necessary to add more alkanol(s) to replace that which has evaporated. This can be done continuously or periodically, but in any event, because of the presence of the cobalt salt material, the total quantity added is substantially less than heretofore required.

In another procedure the components of the stabilizing mixture alone or together are admixed with molten DMT so that the concentration of the stabilizing mixture is substantially higher than the ultimate use concentration. A stabilizing quantity of the concentrate thus formed is subsequently added to the DMT to be stabilized.

The efficacy of the stabilizing mixture of this invention in stabilizing thermally unstable DMT is demonstrated by the following tabulated data obtained in the thermal stability testing of samples of specific embodiments of the thermally stabilized DMT of this invention.

In one thermal stability test, the 175°C. test, the initial color and acidity of samples of thermally unstable DMT alone and with one or more additives at specific concentrations in parts by weight per million part by weight of DMT are measured. The samples in closed containers are then established and maintained at 175°C. The color and acidity of each sample are measured at selected times after establishing the sample at 175°C.

The data in Table I were obtained in applying the 175°C. test to samples of a batch of thermally unstable DMT alone and with the indicated additives at the specified concentrations. In the table the additive designated MeOH is methanol.

The data in Table II were obtained in applying the 175°C. test to samples of another batch of thermally unstable DMT alone and with the indicated additives at the specified concentrations. In the table the additive cobalt benzoate is identified as CoBz.

TABLE II

| Sample | Additives | Concentration (p.p.m. of DMT) | Color (Hazen units) | | | Acidity (KOH, mg./g.) | |
|---|---|---|---|---|---|---|---|
| | | | Initial | 8 hrs. | 24 hrs. | Initial | 64 hrs. |
| 1 | None | | 5 | 20 | 40 | 0.002 | 0.37 |
| 2 | MeOH | 50 | 5 | 20 | 40 | 0.002 | 0.31 |
| 3 | CoBz | 1 | 5 | 5 | 5 | 0.002 | 0.15 |
| 4 | CoBz | 3 | 5 | 5 | 10 | 0.002 | 0.46 |
| 5 | {MeOH / CoBz} | 50 / 0.1 | 5 | 5 | 5 | 0.002 | 0.013 |
| 6 | {MeOH / CoBz} | 50 / 1 | 5 | 5 | 5 | 0.002 | 0.005 |
| 7 | {MeOH / CoBz} | 50 / 3 | 5 | 15 | 20 | 0.002 | 0.12 |

The data in Table III were obtained in applying the 175°C. test to samples of still another batch of thermally unstable DMT alone and with the indicated additives at the specified concentrations. In the table cobaltous acetate is identified as $CoAc_2$, cobalt toluate is identified as CoTol, and cobalt terephthalate as CoTer.

TABLE III

| Sample | Additives | Concentration (p.p.m. of DMT) | Color (Hazen units) | | | | | Acidity (KOH, mg./g.) | |
|---|---|---|---|---|---|---|---|---|---|
| | | | Initial | 4 hrs. | 8 hrs. | 12 hrs. | 16 hrs. | Initial | 10 hrs. |
| 1 | None | | 5 | 20 | 35 | 60 | 80 | 0.005 | 0.78 |
| 2 | MeOH | 80 | 5 | 15 | 40 | 60 | 75 | 0.005 | 0.63 |
| 3 | $CoAc_2$ | 1 | 5 | 10 | 15 | 20 | 20 | 0.005 | 0.43 |
| 4 | $CoAc_2$ | 1 | 5 | 10 | 20 | 20 | 30 | 0.005 | 0.27 |
| 5 | {MeOH / $CoAc_2$} | 80 / 1 | 5 | 10 | 10 | 10 | 10 | 0.005 | 0.08 |
| 6 | {MeOH / $CoAc_2$} | 80 / 1 | 5 | 10 | 15 | 15 | 15 | 0.005 | 0.03 |
| 7 | CoTol | 1 | 5 | 10 | 15 | 20 | 30 | 0.005 | 0.22 |
| 8 | {MeOH / CoTol} | 80 / 1 | 5 | 5 | 10 | 15 | 15 | 0.005 | 0.04 |
| 9 | CoTer | 1 | 5 | 15 | 20 | 30 | 50 | 0.005 | 0.51 |
| 10 | {MeOH / CoTer} | 80 / 1 | 5 | 15 | 15 | 20 | 30 | 0.005 | 0.20 |

In another thermal stability test (230°C. test) the same procedure and equipment are involved as in the 175°C. test, except that the samples are established and maintained at 230°C. The data in Table IV were obtained in applying this test to samples of the same batch of DMT as involved in the samples of Table I, alone and with the additives at the concentrations indicated in Table IV.

TABLE I

| Sample | Additives | Concentration (p.p.m. of DMT) | Color (Hazen units) | | | | Acidity (KOH, mg./g.) | |
|---|---|---|---|---|---|---|---|---|
| | | | Initial | 4 hrs. | 12 hrs. | 20 hrs. | Initial | 60 hrs. |
| 1 | None | | 5 | 25 | 55 | 90 | 0.004 | 0.87 |
| 2 | MeOH | 50 | 5 | 25 | 35 | 100 | 0.004 | 0.51 |
| 3 | MeOH | 100 | 5 | 15 | 45 | 70 | 0.004 | 0.48 |
| 4 | MeOH | 500 | 5 | 10 | 15 | 15 | 0.004 | 0.03 |
| 5 | $CoCl_2$ | 0.01 | 5 | 30 | 70 | 120 | 0.004 | 0.046 |
| 6 | $CoCl_2$ | 0.1 | 5 | 10 | 20 | 25 | 0.004 | 0.11 |
| 7 | $CoCl_2$ | 1 | 5 | 10 | 15 | 20 | 0.004 | 0.15 |
| 8 | $CoCl_2$ | 3 | 5 | 5 | 15 | 55 | 0.004 | 0.37 |
| 9 | {MeOH / $CoCl_2$} | 50 / 0.1 | 5 | 10, 10 | 15 | 15 | 0.004 | 0.006 |
| 10 | {MeOH / $CoCl_2$} | 100 / 1 | 5 | 5 | 5 | 5 | 0.004 | 0.09 |
| 11 | {MeOH / $CoCl_2$} | 100 / 3 | 5 | 10 | 15, 15 | 20 | 0.004 | 0.030 |
| 12 | {MeOH / $CoCl_2$} | 500 / 0.01 | 5 | 5 | 10 | 10 | 0.004 | 0.017 |
| 13 | {MeOH / $CoCl_2$} | 500 / 1 | 5 | 5 | 5 | 5 | 0.004 | 0.011 |

TABLE IV

| Sample | Additives | Concentration (p.p.m. of DMT) | Color (Hazen units) Initial | 1 hr. | 6 hrs. | 4 hrs. | 8 hrs. |
|---|---|---|---|---|---|---|---|
| 1 | None | | 5 | 50 | 150 | 250 | >500 |
| 2 | MeOH | 50 | 5 | 40 | 120 | 250 | >500 |
| 3 | MeOH | 500 | 5 | 25 | 100 | 200 | >500 |
| 4 | $CoCl_2$ | 0.1 | 5 | 20 | 45 | 100 | 200 |
| 5 | MeOH<br>$CoCl_2$ | 30<br>0.1 | 5 | 15 | 40 | 120 | 200 |
| 6 | MeOH<br>$CoCl_2$ | 100<br>0.1 | 5 | 15 | 25 | 80 | 100 |

The foregoing data demonstrate that the thermally induced increases in coloring and acidity of thermally unstable DMT stabilized according to this invention are substantially lower than the increases in coloring and acidity of the thermally unstable DMT without stabilizing material.

Thus, this invention provides a thermally stabilized DMT composition.

A feature of advantage of this invention in that the increase in color of DMT stabilized according to this invention, which increase is brought about by high temperatures at the time of storage or transfer or conversion of it into polyester, is substantially lower than in the case of unstablized thermally stable DMT. Consequently, polyester made from DMT stabilized according to this invention has substantially less color than polyester made from the thermally unstable DMT without stabilizing material.

Another feature of advantage is that the cobalt salt material does not in general adversely affect the reactions involved in the production of polyester from glycols and the stabilized DMT of this invention. Indeed, in some published polyester processes, specific cobalt salt material is employed as a catalyst. Consequently, in some embodiments of this invention, the cobalt salt material in the stabilized DMT of this invention destined for such a polyester process consists essentially of the specific cobalt salt material employed as a catalyst in that process.

Other features, advantages and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The language "consisting essentially of" as used in this specification excludes any unrecited substance at a concentration sufficient to substantially adversely affect the essential properties ahd characteristics of the composition being defined, while permitting the presence of one or more unrecited substances at concentrations insufficient to substantially adversely affect said essential properties and characteristics.

The embodiments of the invention in which an exclusive property or privilege is claimed are defined as follows:

1. A thermally stable composition consisting essentially of thermally unstable dimethyl terephthalate and dispersed therein at a stabilizing concentration a mixture consisting essentially of $C_1$—$C_4$ alkanol material and cobalt salt material selected from the group consisting of cobalt halides, aromatic carboxylic acid salts of cobalt, and aliphatic carboxylic acid salts of cobalt, the weight ratio of said cobalt salt material to said alkanol material being in the range from about 1:500,000 to about 1:2.

2. A composition according to claim 1 in which the concentration of said mixture is from about five hundred to about ten parts by weight per million parts by weight of said dimethyl terephthalate.

3. A composition according to claim 2 in which the concentration of said mixture is in the range from about one hundred to about thirty parts by weight per million parts by weight of the dimethyl terephthalate.

4. A composition according to claim 3 in which the weight ratio of said cobalt salt material to said alkanol material is in the range from about 1:10,000 to about 1:10.

5. A composition according to claim 1 in which the $C_1$—$C_4$ alkanol material consists essentially of methanol.

6. A composition according to claim 5 in which the cobalt salt material consists essentially of $CoCl_2$.

7. A composition according to claim 5 in which the cobalt salt material consists essentially of cobalt acetate.

8. A composition according to claim 5 in which the cobalt salt material consists essentially of cobalt benzoate.

9. A composition according to claim 5 in which the cobalt salt material consists eseentially of cobalt toluate.

10. A composition according to claim 5 in which the cobalt salt material consists essentially of cobalt terephthalate.

* * * * *